(12) United States Patent
Yang

(10) Patent No.: US 8,488,972 B2
(45) Date of Patent: Jul. 16, 2013

(54) DIRECTIONAL CONTROL/TRANSMISSION SYSTEM WITH DIRECTIONAL LIGHT PROJECTOR

(76) Inventor: Tai-Her Yang, Dzan-Hwa (TW)

( * ) Notice: Subject to any disclaimer, the term of this patent is extended or adjusted under 35 U.S.C. 154(b) by 757 days.

(21) Appl. No.: 11/442,266

(22) Filed: May 30, 2006

(65) Prior Publication Data

US 2007/0279183 A1    Dec. 6, 2007

(51) Int. Cl.
*G05B 23/02* (2006.01)
*H04B 10/00* (2006.01)

(52) U.S. Cl.
USPC ............................ 398/131; 398/130; 398/156

(58) Field of Classification Search
USPC ............... 398/156, 151, 118, 122, 129, 131, 398/140, 201, 182
See application file for complete search history.

(56) References Cited

U.S. PATENT DOCUMENTS

| | | | |
|---|---|---|---|
| 4,260,254 A * | 4/1981 | Braun | 356/154 |
| 4,724,298 A * | 2/1988 | Hawkins et al. | 219/121.78 |
| 4,727,600 A * | 2/1988 | Avakian | 398/126 |
| 5,218,356 A * | 6/1993 | Knapp | 342/350 |
| 5,617,236 A * | 4/1997 | Wang et al. | 398/117 |
| 6,359,712 B1 * | 3/2002 | Kamitani | 398/41 |
| 6,462,847 B2 * | 10/2002 | Willebrand | 398/139 |
| 6,507,424 B2 * | 1/2003 | Sakanaka | 398/129 |
| 6,566,670 B1 * | 5/2003 | Buisker et al. | 250/559.36 |
| 6,847,496 B1 * | 1/2005 | Presby | 359/707 |
| 7,734,181 B2 * | 6/2010 | Bahar | 398/115 |
| 7,885,547 B2 * | 2/2011 | Nakaso et al. | 398/130 |
| 8,204,383 B2 * | 6/2012 | Shin et al. | 398/129 |
| 2002/0149822 A1 * | 10/2002 | Stroud | 359/154 |
| 2003/0016532 A1 * | 1/2003 | Reed | 362/198 |
| 2003/0217120 A1 * | 11/2003 | Hickey et al. | 709/219 |
| 2004/0004711 A1 * | 1/2004 | French et al. | 356/73.1 |
| 2004/0008996 A1 * | 1/2004 | Aronson et al. | 398/202 |
| 2004/0141485 A1 * | 7/2004 | Yoshino et al. | 370/338 |
| 2005/0116667 A1 * | 6/2005 | Mueller et al. | 315/312 |
| 2006/0062099 A1 * | 3/2006 | Yazaki et al. | 369/44.11 |
| 2007/0053695 A1 * | 3/2007 | Margaritis | 398/131 |
| 2007/0109416 A1 * | 5/2007 | Lortie et al. | 348/211.14 |
| 2008/0044188 A1 * | 2/2008 | Kagawa et al. | 398/128 |
| 2009/0195164 A1 * | 8/2009 | Joseph | 315/151 |
| 2009/0208221 A1 * | 8/2009 | Sasai | 398/130 |
| 2012/0262699 A1 * | 10/2012 | Steffey | 356/4.01 |

OTHER PUBLICATIONS

Arrange. (2007). In the American Heritage® Dictionary of the English Language. Retrieved from http://www.credoreference.com/entry/hmdictenglang/arrange.*

* cited by examiner

*Primary Examiner* — Nathan Curs
*Assistant Examiner* — Tanya Ngo
(74) *Attorney, Agent, or Firm* — Bacon & Thomas, PLLC

(57) ABSTRACT

A directional control/transmission system adapted with a directional light projector to mark the direction of signal control or transmission; comprised of a control or transmission system having a directional infrared or ultrasonic waves as a carrier adapted with a light projector to output a visible light-spot target to indicate control or transmission direction of directional infrared or ultrasonic waves; or to project the target on a monitor for auxiliary help; or to serve as a lighting beam; or to adjust focus for functioning as the light-spot target or selection of the lighting beam.

8 Claims, 1 Drawing Sheet

DIRECTIONAL CONTROL/TRANSMISSION SYSTEM WITH DIRECTIONAL LIGHT PROJECTOR

BACKGROUND OF THE INVENTION (a) Field of the Invention

The present invention is related to a directional control/transmission system with a directional light projector, and more particularly, to one marks by means of a light projector signal receiving/transmission direction in visible light for a system having directional infrared or ultrasonic waves as a control or transmission carrier that is applicable to various information systems, communication systems, amusement systems, monitor systems, electric home appliances, toys, and A/V installations or any other electric appliance having infrared or ultrasonic waves as control or transmission carrier to control or transmit message.

(b) Description of the Prior Art

Whereas signal receiving and transmission is directional, the operation of a conventional control or transmission system having a directional infrared or ultrasonic waves as its carrier is not friendly due to difficulties in making sure of the direction in receiving or transmitting signal.

SUMMARY OF THE INVENTION

The primary purpose of the present invention is to provide a directional control/transmission system adapted with a directional light projector to mark the direction of signal control or transmission. To achieve the purpose, the present invention relates to a control or transmission system having a directional infrared or ultrasonic waves as a carrier adapted with a light projector to output a visible light-spot target to indicate control or transmission direction of directional infrared or ultrasonic waves; or to project the target on a monitor to support help; or to serve as a lighting beam; or to adjust focus for functioning as the light-spot target or selection of the lighting beam.

DETAILED DESCRIPTION OF THE PREFERRED EMBODIMENTS

Figure 1:
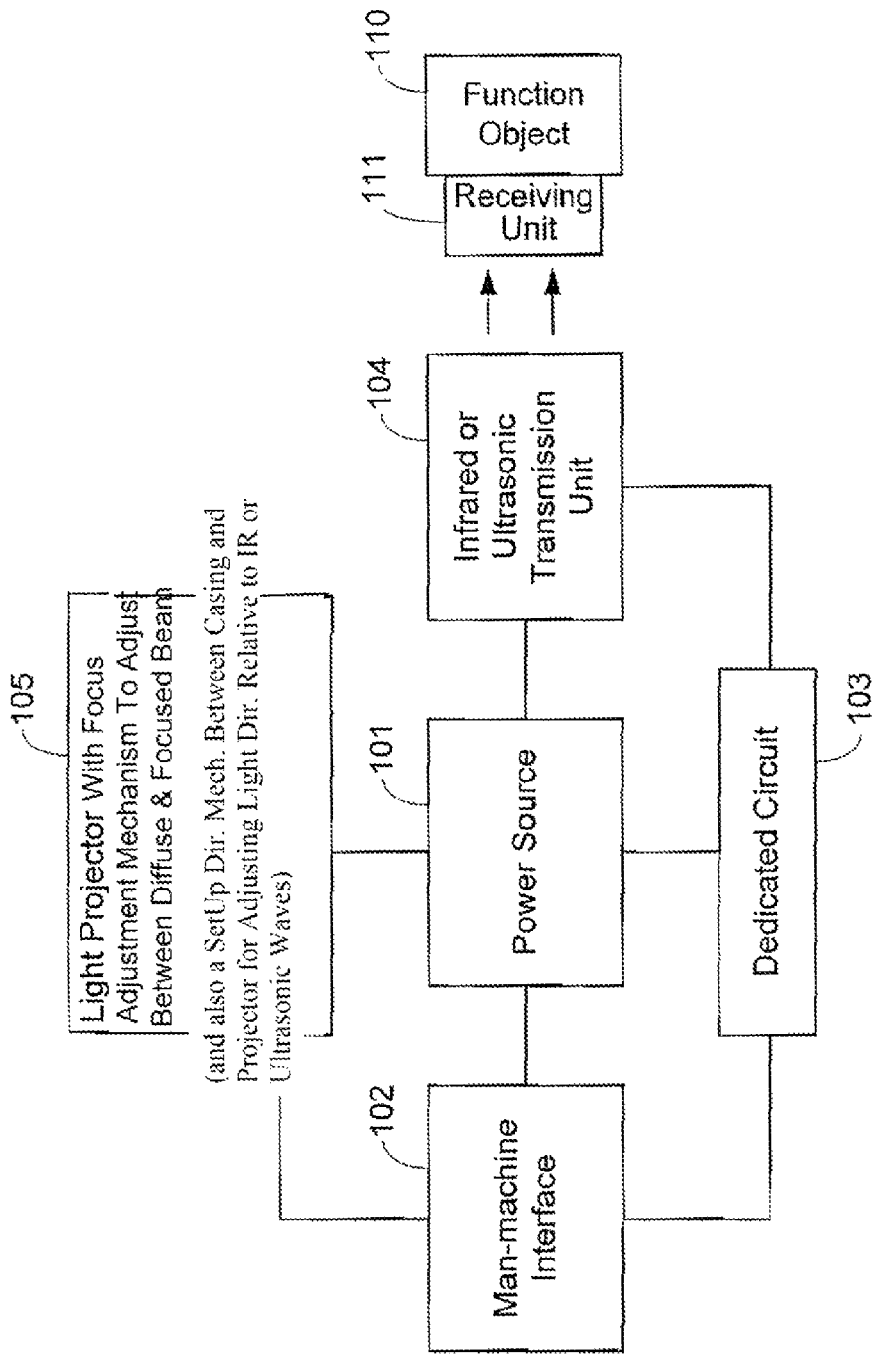
FIG. 1 is a circuit block chart of a directional control/transmission system adapted with a directional light projector of the present invention.

A directional control/transmission system adapted with a directional light projector of the present invention controls the directional light projector to emit visible light to project on an infrared or ultrasonic receiving unit of a function object designated as the operation target, or on a specifically designated location for fast confirmation of the receiving/transmission direction to facilitate infrared or ultrasonic transmission or control.

Referring to FIG. 1, a circuit block chart of the directional control/transmission system adapted with a directional light projector of the present invention is essentially comprised of:

a power source 101: relates to any source of AC city power or any portable DC power to supply power to a man-machine interface 102, a dedicated circuit 103, a light projector 105, and an infrared or ultrasonic transmission unit 104 to be described below;

the man-machine interface 102: related to an optional item, to be provided depending on the requirements of the applied device, in the form of a switch, pushbutton, keyboard, display; or one or any combination of video, audio, optical, radiation frequency of conventional operating interfaces to operate the dedicated circuit 103, the infrared or ultrasonic transmission unit 104, and the light projector 105 that generates visible light;

the dedicated circuit 103: comprised of solid electronic device, or dynamo-electric device, or integrated circuit and related software to provide functioning operation of the directional control/transmission system adapted with a directional light projector;

the infrared or ultrasonic transmission unit 104: as driven by the dedicated circuit 103 to convert electric signal into infrared or ultrasonic signal to control or transmit signal to a function object 110 provided with an infrared or ultrasonic receiving unit 111 as target of control;

the light projector 105: relates to a laser, diode and identical drive circuit, or an LED, bulb or any other device that is capable of converting electric energy into visible light energy.

The directional control/transmission system adapted with the directional light projector of the present invention can be applied in information systems, communication systems, games, monitor systems, home electric appliances, toys, AV systems, or any other electric appliance operating on infrared or ultrasonic waves as the control or transmission carrier to execute message control or transmission including mouse, trackball, keyboard, handset, digital camera, PDA, MP3 player, computer, printer, recording device, TV, TV game, RC toy, any other electric home appliance, or any other device that operates on infrared or ultrasonic control or transmission.

Additional to the installation of the receiving unit 111 for the function object 110 adapted with a unit to receive infrared or ultrasonic signal for receiving infrared or ultrasonic signal control or transmission; both of the directional control/transmission system adapted with the directional light projector and the function object 110 are provided at the same time each with the power source 101, the man-machine interface 102, the dedicated circuit 103, the infrared of ultrasonic transmission unit 104, the light projector 105, and the receiving unit 111 for two-way receiving and transmission of signal.

The following applications and installation methods are available for selection for the light projector 105 in the directional control/transmission system adapted with the directional light projector to produce visible light as applicable:

(1) Emitting visible light-spot index: the visible light spot may serve auxiliary help, mark the location of the receiving unit 111 of the function object 110 serving as the subject matter of control to facilitate fast confirmation of the receiving or transmission direction in infrared or ultrasonic single control or transmission.

(2) Emitting light projection beam: in addition to helping confirm the control or transmission direction to facilitate receiving or transmission operation with infrared or ultrasonic waves as the carrier to confirm the directional control or transmission, the light projector 105 may operate for lighting purpose or function as an auxiliary help.

(3) An optional optical lens and mechanism with range adjustable may be provided as required to select a focus as the light spot or to diffuse for lighting purpose.

The relation between the direction of the light spot or the projection beam generated by the light projector 105 adapted to the casing of the control/transmission system of the present invention and the direction to control signal receiving or transmission of infrared or ultrasonic waves serving as the control or transmission carrier may be such as:

(1) Both are in the same direction; or (2) Both are in different directions; or (3) An adjustable and setup direction mechanism may be provided between the light projector 105 and the casing of the control/transmission system of the present invention, e.g., an adjustable and lockup double joint mechanism or fish-eye mechanism so to adjust the light projection direction for the light projector 105 for serving the direction of infrared or ultrasonic signal of the control or transmission carrier with both directions indicating the same or not.

Accordingly, the directional control/transmission system adapted with the directional light projector when operating by means of the circuit described above marks by the light spot or beam generated from the light projector the control or transmission direction of the infrared or ultrasonic carrier to aim at the receiving unit 111 of the function object 110 serving as the subject matter of the control, thus to execute control or transmission in correct direction.

The directional control/transmission system adapted with the directional light projector of the present invention may be set as such that the light spot or beam emitted from the light projector 105 is delivered to a specified area other than the receiving unit 111 of the function object 110 serving as the subject matter of the control; meanwhile, the direction to control or transmit infrared or ultrasonic signal aims at the receiving unit 111 of the function object 110 serving as the subject matter of the control. For example, when a display is set as the specific projection area for the directional visible light spot emitted from the light projector 105 while the direction for the infrared or ultrasonic radiation direction of the control or transmission carrier aims at the location of the receiving unit 111 of the function object 110 serving as the subject matter of the control.

Furthermore, as applicable, the light projector 105 from the directional control/transmission system adapted with the directional light projector and the infrared or ultrasonic transmission unit 104 may be each made a stand alone unit or sharing the same structure.

While operating on infrared or ultrasonic waves as the control or transmission carrier, the directional control/transmission system adapted with the directional light projector is characterized in that it is provided with the light projector 105 to emit visible light for confirming the signal receiving or transmission for infrared or ultrasonic control or transmission; or for serving auxiliary help by projection, or functioning as auxiliary lighting to upgrade the convenience in use and correct the defect found with the infrared or ultrasonic control/transmission system of the prior art in failing to achieve fast locating the control or transmission direction.

The invention claimed is:

1. A directional control/transmission system arranged to control or communicate with a device to be controlled or communicated with, said device having a receiving unit by using infrared or ultrasonic waves as a carrier, said directional control/transmission system comprising:
   an infrared or ultrasonic transmission unit for converting electrical signals into said infrared or ultrasonic waves and for transmitting said infrared or ultrasonic waves;
   a dedicated circuit for operating said transmission unit;
   a power source; and
   a directional light projector,
   wherein the light projector is connected to said power source and outputs a visible light beam,
   wherein the directional light projector further includes an arrangement for diffusing said visible light beam to serve as a lighting beam, and
   wherein said visible light beam is arranged to be transmitted in a same direction as the infrared or ultrasonic waves to facilitate aiming of the infrared or ultrasonic waves at the said receiving unit of said device to be controlled or communicated with, and
   wherein said visible light beam is adjustable to be aimed in a different direction than the infrared or ultrasonic waves so as to illuminate a display while the infrared or ultrasonic waves are aimed at said receiving unit.

2. A directional control/transmission system as claimed in claim 1, wherein said directional light projector and infrared or ultrasonic transmission unit are stand-alone units.

3. A directional control/transmission system as claimed in claim 1, wherein said directional light projector and infrared or ultrasonic transmission unit share a common structure.

4. A directional control/transmission system as claimed in claim 1, wherein said device to be controlled or communicated is selected from the group consisting of a device used in an information or communication system, a game, a monitoring device, a home electric appliance, a toy, or an AV device.

5. A directional control/transmission system as claimed in claim 1, wherein the directional control/transmission system further comprises a man-machine interface connected to said power source, light projector, and dedicated circuit for controlling said light projector and said infrared or ultrasonic transmission unit.

6. A directional control/transmission system as claimed, in claim 1, further comprising a receiving unit in said directional control/transmission system for enabling two-way communication with said device.

7. A directional control/transmission system as claimed in claim 1, herein said arrangement for diffusing said light beam includes a focus adjustment mechanism to for changing a width of said visible light beam.

8. A directional control/transmission system as claimed in claim 7, wherein said focus adjustment mechanism includes an optical lens and range adjustment mechanism.

* * * * *